United States Patent
Nakamura et al.

(10) Patent No.: US 8,144,483 B2
(45) Date of Patent: Mar. 27, 2012

(54) APPARATUS HAVING A BOARD SECURED TO A CASING

(75) Inventors: Kazuhiro Nakamura, Hachioji (JP); Hiroshi Aiba, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/860,697

(22) Filed: Aug. 20, 2010

(65) Prior Publication Data

US 2011/0134615 A1    Jun. 9, 2011

(30) Foreign Application Priority Data

Dec. 4, 2009  (JP) .................................. 2009-276635

(51) Int. Cl.
*H05K 7/02*    (2006.01)
(52) U.S. Cl. ......................................................... 361/807
(58) Field of Classification Search .................. 361/807, 361/752, 801; 174/520, 535, 542, 543, 545
See application file for complete search history.

(56) References Cited

U.S. PATENT DOCUMENTS

| | | | | |
|---|---|---|---|---|
| 6,249,442 | B1 * | 6/2001 | Watanabe ...................... | 361/801 |
| 6,490,164 | B2 * | 12/2002 | Takahashi et al. ............ | 361/752 |
| 6,809,933 | B2 | 10/2004 | Kuchiishi et al. | |
| 2010/0039784 | A1 * | 2/2010 | Hayashi ........................ | 361/777 |
| 2011/0134041 | A1 * | 6/2011 | Yamamoto et al. ........... | 345/167 |

FOREIGN PATENT DOCUMENTS

| | | |
|---|---|---|
| JP | S59-009587 U | 1/1984 |
| JP | S60-066090 U | 5/1985 |
| JP | S61-123590 U | 8/1986 |
| JP | S63-080890 U | 5/1988 |
| JP | H02-024585 U | 2/1990 |
| JP | H03-48287 U | 5/1991 |
| JP | H04-159799 A | 6/1992 |
| JP | 2001-291978 A | 10/2001 |

OTHER PUBLICATIONS

Notice of Reasons for Rejection mailed by the Japan Patent Office on Oct. 19, 2010 in the corresponding Japanese patent application No. 2009-276635 in 9 pages.
Notice of Reasons for Rejection mailed by the Japan Patent Office on Jan. 18, 2011 in the corresponding Japanese patent application No. 2009-276635 in 10 pages.
Information Sheet for Information Disclosure Statement.

* cited by examiner

*Primary Examiner* — Jeremy Norris
*Assistant Examiner* — Tremesha S Willis
(74) *Attorney, Agent, or Firm* — Knobbe, Martens, Olson & Bear, LLP

(57) ABSTRACT

According to one embodiment, an electronic apparatus includes a casing, a board contained in the casing, a support surface provided in the casing and supports the board, a first fixing portion provided integrally with the support surface and holds the board between itself and the support surface, and a second fixing portion provided integrally with the support surface. The second fixing portion is elastically displaced between a first position where the second fixing portion engages with the board and a second position where the projecting portion is removed from the board.

10 Claims, 9 Drawing Sheets

APPARATUS HAVING A BOARD SECURED TO A CASING

CROSS-REFERENCE TO RELATED APPLICATIONS

This application is based upon and claims the benefit of priority from Japanese Patent Application No. 2009-276635, filed Dec. 4, 2009; the entire contents of which are incorporated herein by reference.

FIELD

Embodiments described herein relate generally to an electronic apparatus provided with a board attachment structure attached without screws.

BACKGROUND

An electronic apparatus, such as a portable computer, is required to be thin for the purpose of easy carrying. To thin the portable computer, a plurality of boards and wires are arranged to be laid on one another inside the casing.

The boards arranged inside the casing are fixed to a base provided in the casing by screws. To fix the boards by screws, bosses to receive the screws are provided on the base. The ends of the screws pass through and project out of the bosses. The projecting portions of the screws and the bosses restrict arrangement of the other parts and form a dead space in the casing.

Jpn. Pat. Appln. KOKAI Publication No. 2001-291978 discloses a board holding structure attached without screws. This holding structure comprises a fixing hook to hold the board and a stopper. The board, the rear edge portion of which is put on the stopper, is slid to be inserted under the fixing hook. Thus, the board is held by the fixing hook and the stopper.

In the conventional holding structure, the board is attached to the base by sliding the board with the rear edge portion thereof put on the stopper. However, if the board is thin, it may be bent by load applied thereto from the stopper when sliding.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an electronic apparatus includes a casing, a board contained in the casing, a support surface provided in the casing and supports the board, a first fixing portion provided integrally with the support surface and holds the board between itself and the support surface, and a second fixing portion provided integrally with the support surface. The second fixing portion is elastically displaced between a first position where the second fixing portion engages with the board and a second position where the projecting portion is removed from the board.

A first embodiment will be described below with reference to FIGS. 1 to 6.

Figure 1:
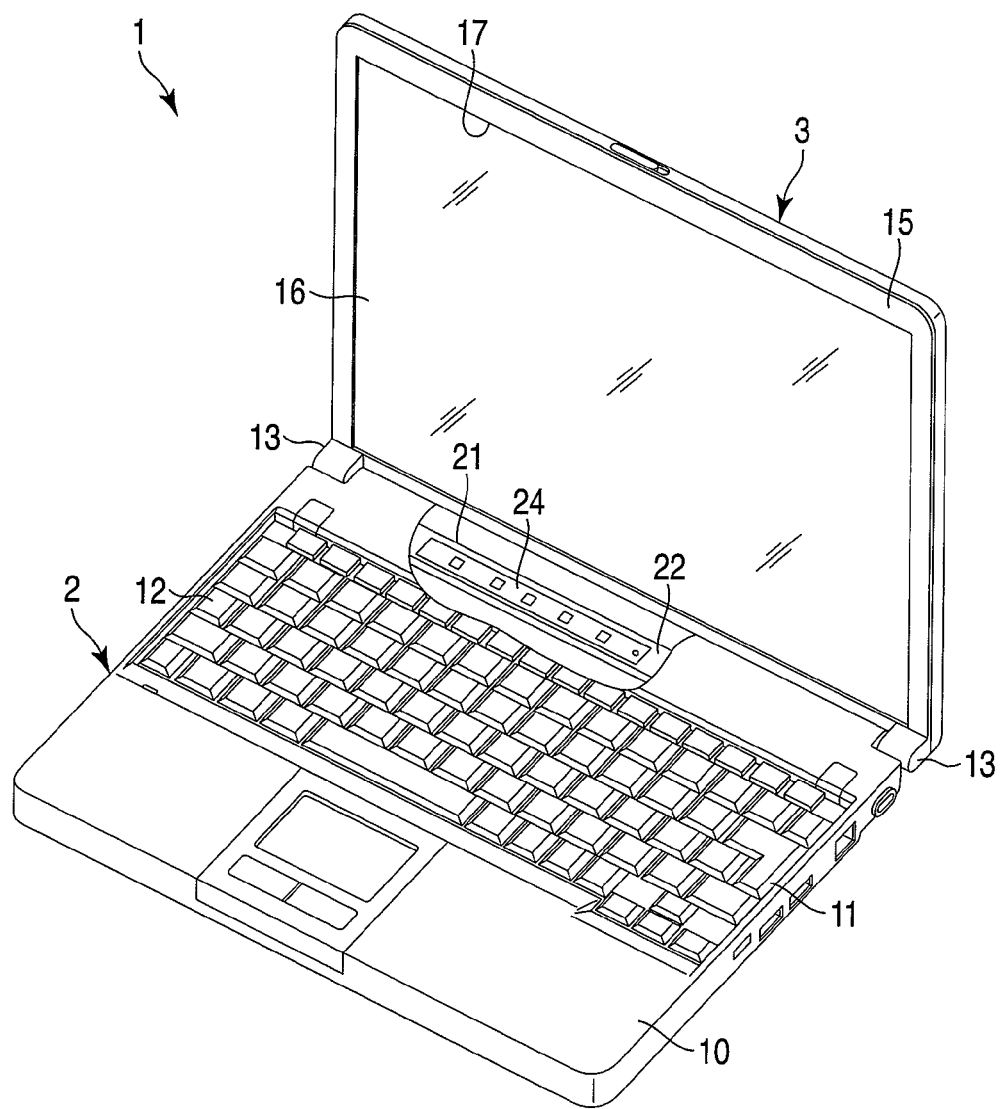
FIG. 1 is an exemplary partially cutaway perspective view showing a portable computer according to a first embodiment.

FIG. 1 is a partially cutaway perspective view showing a portable computer 1, which is an example of an electronic apparatus. The portable computer 1 comprises a computer main body 2 and a display module 3.

The computer main body 2 comprises a flat box-shaped casing 10. A keyboard attachment portion 11 is formed on an upper surface of the casing 10. A keyboard 12 is supported by the keyboard attachment portion 11.

The display module 3 is connected to a rear end of the computer main body 2 via a pair of hinge portions 13. The display module 3 is rotatable about the hinge portions 13 between an open position and a closed position. The display module 3 in the closed position lies over the computer main body 2. The display module 3 in the open position stands from the rear end of the computer main body 2.

The display module 3 comprises a flat box-shaped display casing 15 and a liquid crystal display panel 16. The liquid crystal display panel 16 is contained in the display casing 15. The display casing 15 is provided with an opening 17 in the front surface thereof. The opening 17 causes the liquid crystal panel 16 to expose out of the display module 3.

Inside the casing 10, a base 21 which divides the internal space of the casing 10 is provided. The base 21 forms a flat support surface 22. The support surface 22 supports a sub board 24. The sub board 24 is an example of the board. A battery unit 25 (shown in FIG. 4) is disposed on an opposite side of the sub board 24 from the base 21. The battery unit 25 is arranged near the base 21.

Figure 2:
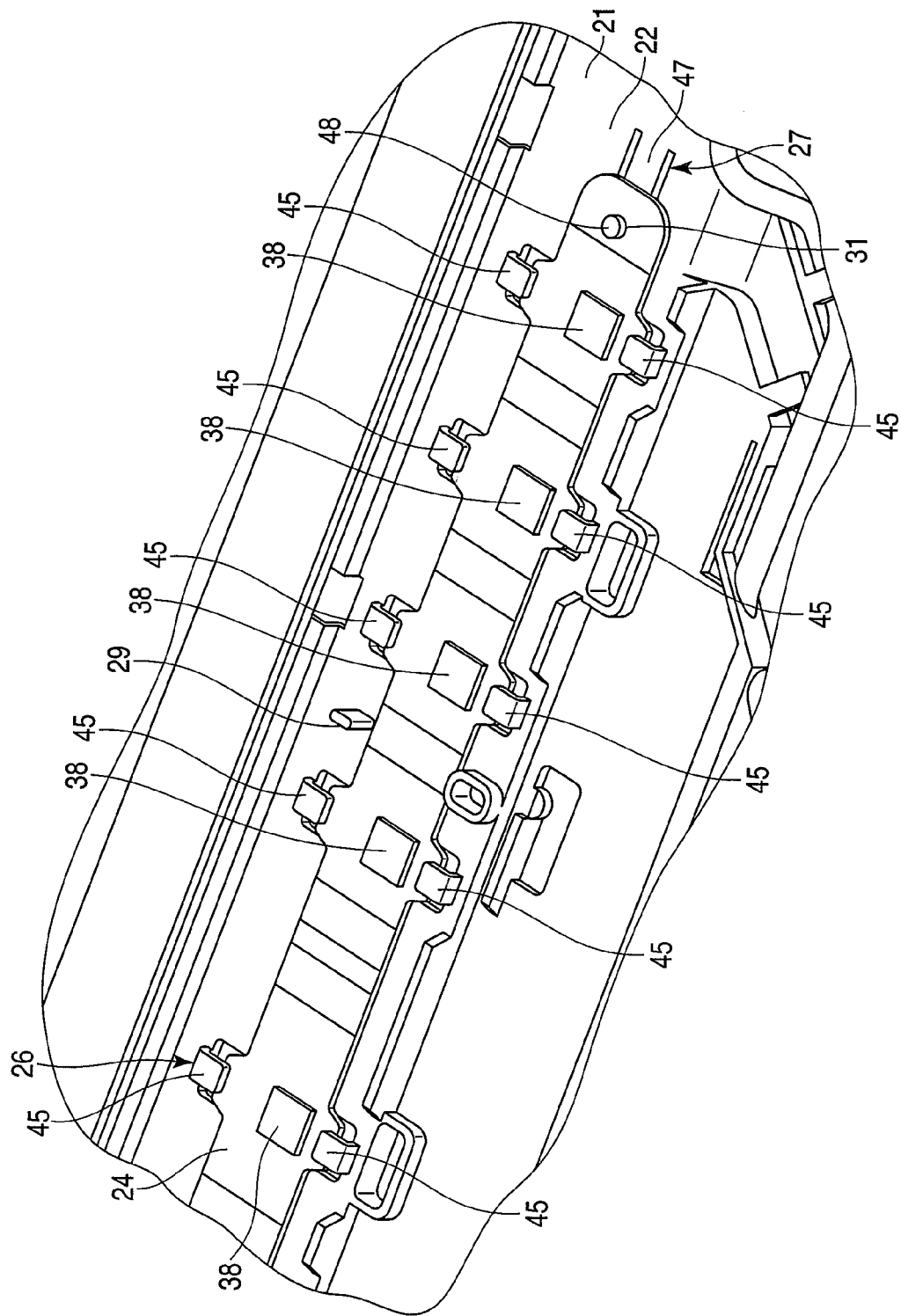
FIG. 2 is an exemplary perspective view showing a board attachment structure of the first embodiment.

FIG. 2 is a perspective view showing an attachment structure for attaching the sub board 24. As shown in FIG. 2, a first fixing portion 26 and a second fixing portion 27 are integrally provided on the support surface 22. The first fixing portion 26 and the second fixing portion 27 fix the sub board 24.

Figure 3:
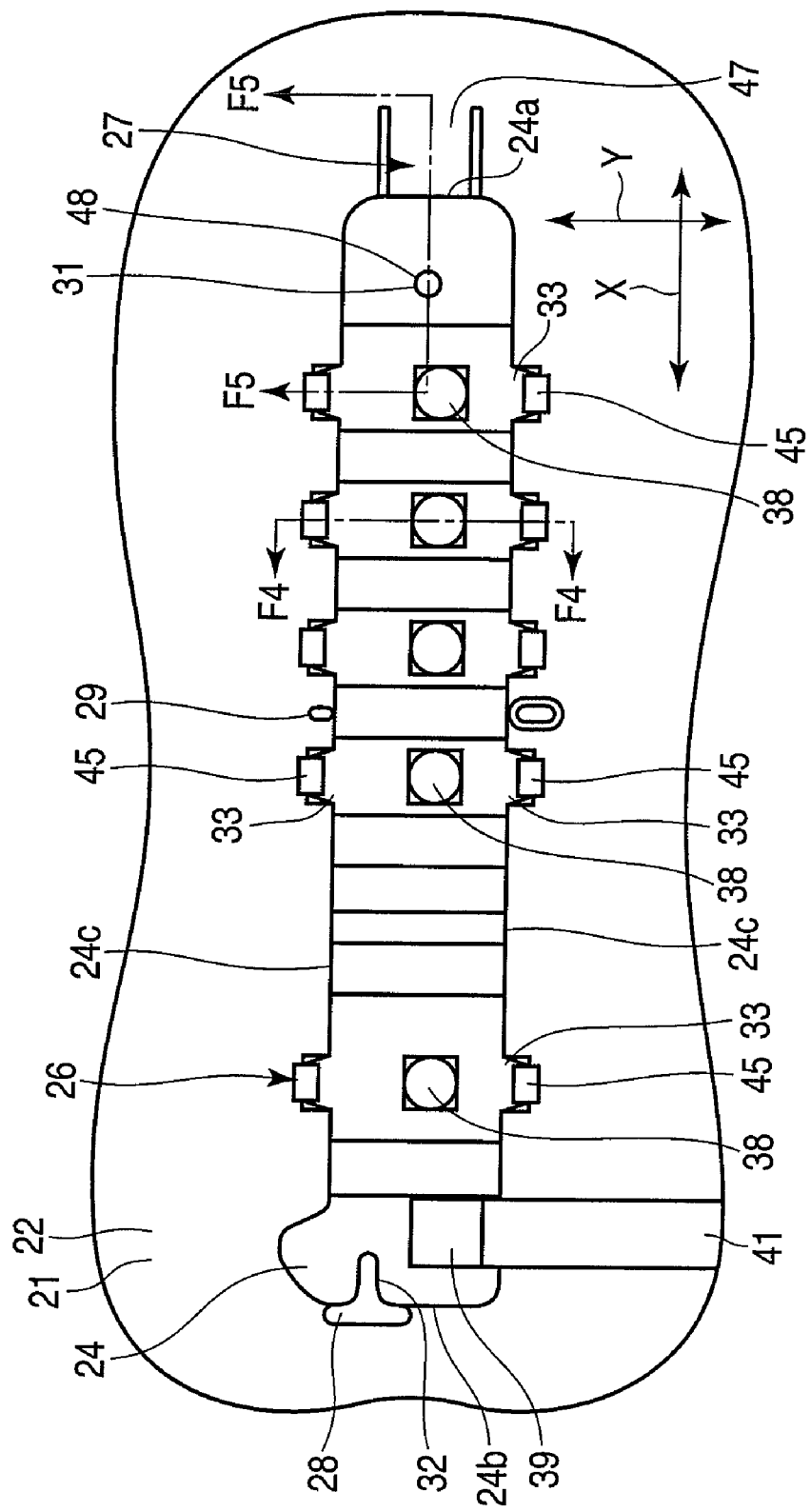
FIG. 3 is an exemplary plan view showing the board attachment structure of the first embodiment.

FIG. 3 is a plan view showing the attachment structure for attaching the sub board 24. As shown in FIG. 3, a stopper 28 and a positioning rib 29 are integrally provided on the support surface 22. The stopper 28 and the rib 29 are examples of holding portions. The stopper 28 and the rib 29 are provided near the sub board 24.

Figure 4:
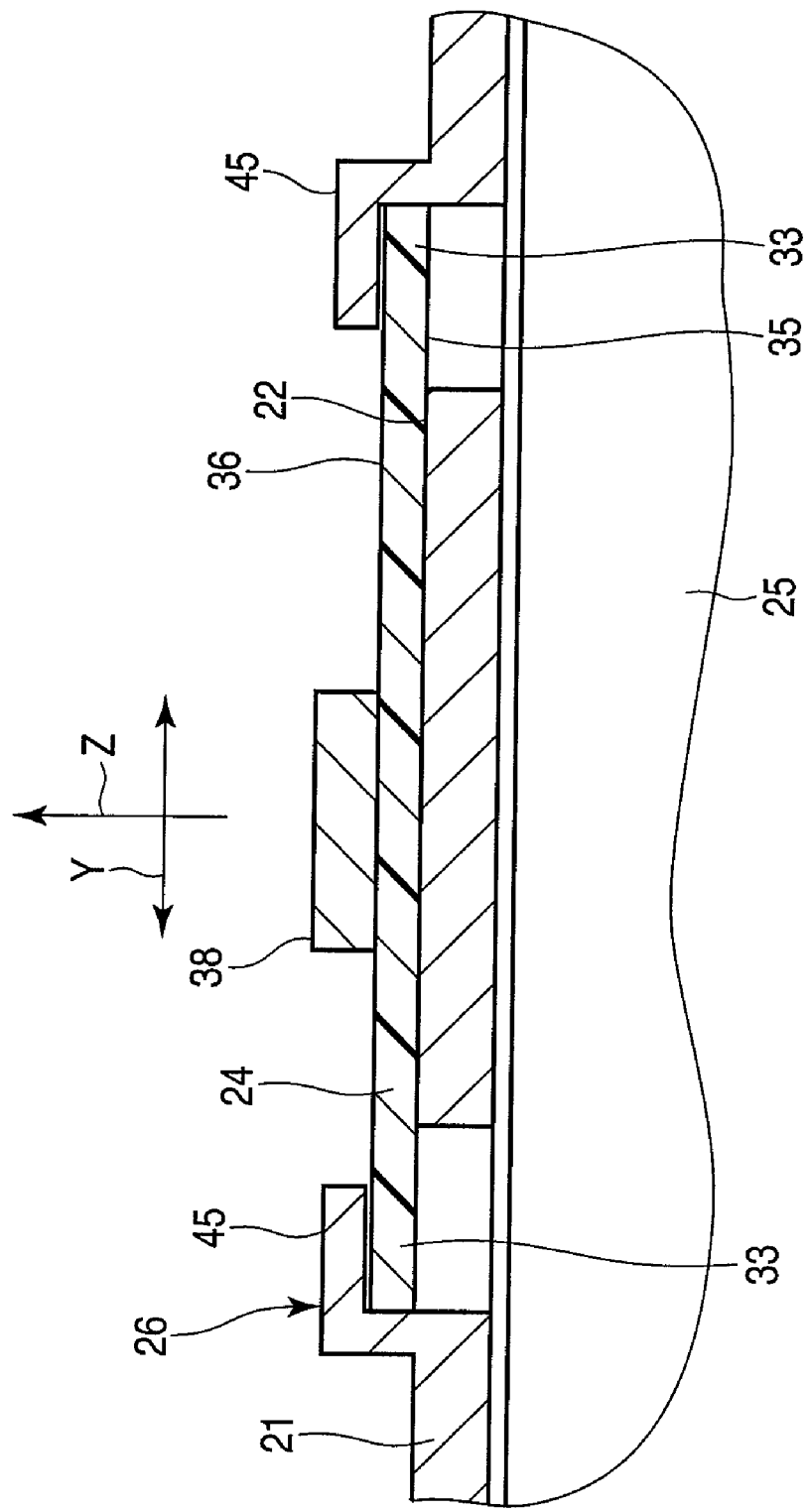
FIG. 4 is an exemplary sectional view taken along a line F4-F4 in FIG. 3.

The sub board 24 will be explained with reference to FIGS. 3 and 4. FIG. 4 is a sectional view taken along a line F4-F4 in FIG. 3.

As shown in FIG. 3, the sub board 24 is a printed wiring board shaped as a rectangular plate. The sub board 24 is contained in the casing 10 together with various parts, such as a main board on which a CPU is mounted.

A fitting portion 31 is provided at one end portion 24a of the sub board 24. The fitting portion 31 is a circular hole passing through the sub board 24. A cut portion 32 is provided at the other end portion 24b of the sub board 24. The cut portion 32 extends inward from the edge of the sub board 24. A plurality of projections 33 are provided on both side edges 24c of the sub board 24. The plurality of projections 33 are paired and project outward from the side edges 24c of the sub board 24.

As shown in FIG. 4, the sub board 24 comprises a first surface 35 and a second surface 36. The first surface 35 faces the support surface 22. The second surface 36 is located the opposite side from the first surface 35. A ground pattern is provided on the first surface 35. A plurality of switches 38 and a connector 39 and a connector 39, as shown in FIG. 3, are mounted on the second surface 36.

As shown in FIG. 3, the switches 38 are respectively located in positions between the paired projections 33 at the side edges 24c. A cable 41 is connected to the connector 39. The cable 41 connects the sub board 24 and the main board.

Figure 5:
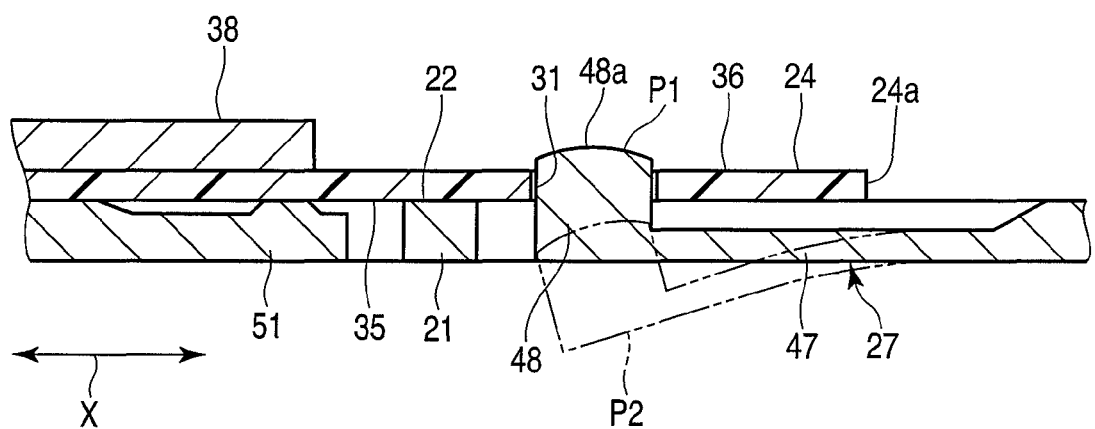
FIG. 5 is an exemplary sectional view taken along a line F5-F5 in FIG. 3.

The attachment structure for attaching the sub board 24 will now be described with reference to FIGS. 3 to 5. FIG. 5 is a sectional view taken along a line F5-F5 in FIG. 3.

As shown in FIG. 3, the first fixing portion 26 comprises a plurality of hooks 45. The hooks 45 face both side edges 24c around the sub board 24. The hooks 45 project from the support surface 22 and engage with the projections 33 of the sub board 24. As shown in FIG. 4, the sub board 24 is interposed between the support surface 22 and the hooks 45.

The sub board 24 is disposed between the support surface 22 and the hooks 45, with the result that the sub board 24 is held. The hooks 45 restrict movement of the sub board 24 in a first direction indicated by an arrow Z in FIG. 4. The first direction is a direction away from the support surface 22.

Further, the hooks 45 face both side edges 24c around the sub board 24, thereby restricting movement of the sub board 24 in a second direction indicated by arrows Y in FIG. 4. The second direction is along the support surface 22 and corresponds to the direction in which the side edges 24c are directed.

As shown in FIG. 5, the second fixing portion 27 comprises a flexible portion 47 and a projecting portion 48. One end of the flexible portion 47 is continuous to the support surface 22. The flexible portion 47 is thinner than the base 21 and can be bent with a little force.

The projecting portion 48 projects from the other end of the flexible portion 47 toward the sub board 24. The projecting portion 48 is provided with a gently curved top portion 48a in its distal end portion. The projecting portion 48 is shaped as a cylindrical column corresponding to the circular hole as the fitting portion 31, and fit in the fitting portion 31.

The projecting portion 48 is fit in the fitting portion 31, thereby holding the sub board 24. The projecting portion 48 restricts movement of the sub board 24 in a third direction indicated by arrows X in FIG. 5. The third direction is along the support surface 22 and corresponds to the direction in which the one end portion 24a and the other end portion 24b of the sub board 24 are directed. The projecting portion 48 also restricts movement of the sub board 24 in the second direction indicated by the arrows Y in FIG. 4.

The second fixing portion 27 is elastically displaced between a first position P1 and a second position P2 by bending of the flexible portion 47. The second fixing portion 27 in the first position P1 is indicated by solid lines in FIG. 5. The second fixing portion 27 in the second position P2 is indicated by two-dot chain lines in FIG. 5. The second fixing portion 27 is normally located at the first position P1, but displaced to the second position P2 by receipt of external force.

In the first position P1, the projecting portion 48 is fit in the fitting portion 31. As a result, the second fitting portion 27 engages with the sub board 24. In the second position P2, the projecting portion 48 is removed from the fitting portion 31. As a result, the second fitting portion 27 is removed from the sub board 24.

As shown in FIG. 3, the stopper 28 projects from the support surface 22. The stopper 28 is brought into contact with an edge of the other end portion 24b of the sub board 24. As a result, the stopper 28 restricts movement of the sub board 24 in the third direction indicated by the arrows X. Furthermore, the stopper 28 enters the cut portion 32. Therefore, the stopper 28 restricts movement of the sub board 24 in the second direction indicated by the arrows Y.

The rib 29 projects from the support surface 22. The rib 29 is brought into contact with both side edges 24c of the sub board 24. Therefore, the rib 29 restricts movement of the sub board 24 in the second direction indicated by the arrows Y.

Thus, the stopper 28 and the rib 29 retain the sub board 24 held by the first fixing portion 26 and the second fixing portion 27 in a fixed position.

As shown in FIG. 5, a leaf spring portion 51 is integrally provided on the support surface 22. The leaf spring portion 51 abuts on the ground pattern provided on the first surface 35 of the sub board 24. The leaf spring portion 51 presses the first surface 35. Accordingly, the leaf spring portion 51 retains the sub board 24 by sandwiching the sub board 24 between itself and the hook 45.

Figure 6:
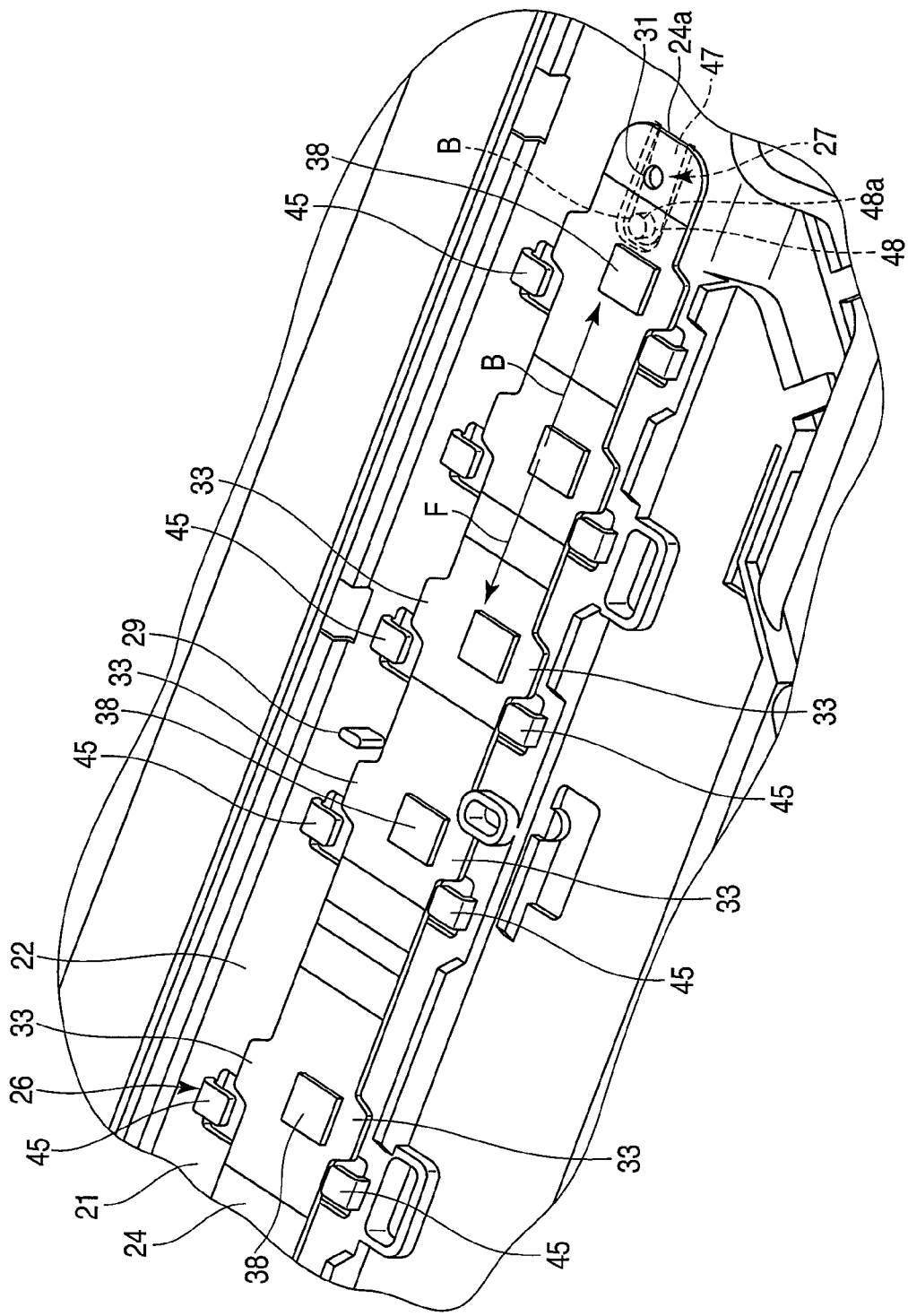
FIG. 6 is an exemplary perspective view showing a board attachment method of the first embodiment.

A method for attaching the sub board 24 will now be described with reference to FIG. 6. FIG. 6 is a perspective view showing a method for attaching the sub board 24. When the sub board 24 is to be attached, the battery unit 25 shown in FIG. 4 has been removed from the portable computer 1.

First, the sub board 24 is placed on the support surface 22 such that the projections 33 are off from the corresponding hooks 45. The projections 33 are off from the corresponding hooks 45 in a fourth direction indicated by an arrow B in FIG. 6. The fourth direction is along the support surface 22 and corresponds to the direction in which the one end portion 24a of the sub board 24 is directed.

When the sub board 24 is placed on the support surface 22, the first surface 35 is put on the top portion 48a of the second fixing portion 27. In this state, when the sub board 24 is pushed down toward the support surface 22, the top portion 48a of the second fixing portion 27 is pushed down by the first surface 35. When the top portion 48a is pushed down, the flexible portion 47 is bent to change the position of the second fixing portion 27 to the second position P2. The flexible portion 47 can be bent with a little force. Since the top portion 48a has the gently curved surface, the load which the sub board 24 receives from the second fixing portion 27 is suppressed to a low level.

When the second fixing portion 27 changes its position to the second position P2, the first surface 35 of the sub board 24 is brought into contact with the support surface 22. Then, the sub board 24 is moved in a fifth direction indicated by an arrow F in FIG. 6. The fifth direction is along the support surface 22 and corresponds to the direction in which the other end portion 24b of the sub board 24 is directed.

When the sub board 24 is moved in the fifth direction, the edge of the other end portion 24b is brought into contact with the stopper 28 and the sub board 24 stops at the position shown in FIG. 3. When the sub board 24 is moved to this position, the sub board 24 is disposed between the support surface 22 and the hooks 45. As a result, the first fixing portion 26 engages with the sub board 24.

Further, when the fitting portion 31 is moved to the position facing the top portion 48a, the second fixing portion 27 is elastically returned to the first position P1. As a result, the projecting portion 48 fits in the fitting portion 31 and the second fixing portion 27 engages with the sub board 24. Thus, the sub board 24 is fixed by the first fixing portion 26 and the second fixing portion 27, and the attachment of the sub board 24 is completed.

In the portable computer 1 having the configuration described above, the sub board 24 is fixed by the first fixing portion 26 and the second fixing portion 27 integrally provided on the support surface 22. The sub board 24 can be attached to the support surface 22 without screws or bosses. Since the sub board 24 can be attached to the support surface 22 without screws or bosses, other parts such as the battery unit 25 can be arranged near the base 21, as shown in FIG. 4. Further, since the number of parts is reduced, the workability when attaching the sub board 24 is improved.

The flexible portion 47 of the second fixing portion 27 can be bent with a little force. Furthermore, the top portion 48a has the gently curved surface. Therefore, the load which the sub board 24 receives from the second fixing portion 27 in the attachment process is suppressed to a low level. Since the load which the sub board 24 receives is suppressed to a low level, various electronic parts and wires can be mounted on the sub board 24 in a high density.

Further, the hooks 45 of the first fixing portion 26 retain the sub board 24 by holding it between the support surface 22 and themselves. Therefore, the sub board 24 is prevented from bending up above the support surface 22.

The switches 38 are respectively located in positions between the paired projections 33. The hooks 45 of the first fixing portion 26 engage with the projections 33. Therefore, the sub board 24 is prevented from being displaced by external force for pushing the switches 38.

A second embodiment will now be described with reference to FIG. 7. In the description, the components of the second embodiment, which are the same as those of the portable computer 1 of the first embodiment, are identified by the same reference numerals as those used for the first embodiment and descriptions thereof are omitted.

Figure 7:
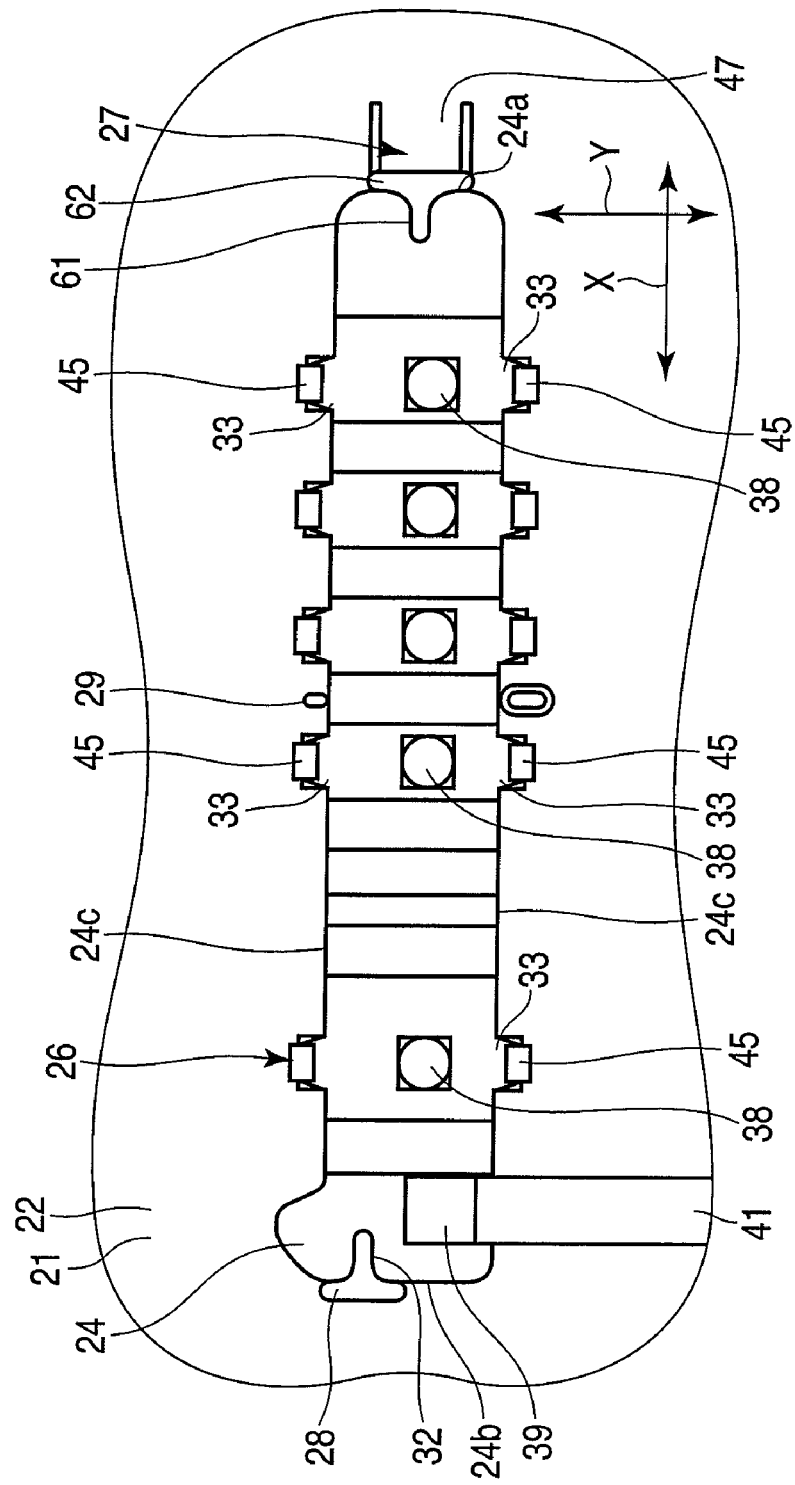
FIG. 7 is an exemplary plan view showing a board attachment structure according to a second embodiment.

FIG. 7 is a plan view showing a structure for attaching a sub board 24 according to the second embodiment. One end portion 24a of the sub board 24 is provided with a cut as a fitting portion 61 instead of the circular hole as the fitting portion 31 of the first embodiment. The fitting portion 61 extends inward from the edge of the one end portion 24a into an inner part of the sub board 24.

A second fitting portion 27 comprises a projecting portion 62 instead of the cylindrical column-shaped projecting portion 48. The projecting portion 62 enters the fitting portion 61 and is brought into contact with the edge of the one end portion 24a. At the first position P1, the projecting portion 62 fits in the fitting portion 61. As a result, the second fixing portion 27 engages with the sub board 24.

The projecting portion 62 is fit in the fitting portion 61, so that the sub board 24 is retained. The projecting portion 62 restricts movement of the sub board 24 in the second direction indicated by arrows Y in FIG. 7. Further, the sub board 24 is disposed between the projecting portion 62 and the stopper 28. Accordingly, the projecting portion 62 restricts movement of the sub board 24 in the third direction indicated by arrows X in FIG. 7.

In the portable computer 1 having the configuration described above, the sub board 24 is fixed by the first fixing portion 26 and the second fixing portion 27 as well as in the first embodiment. Therefore, the sub board 24 can be attached to the support surface 22 without screws or bosses.

A third embodiment will now be described with reference to FIG. 8. In the description, the components of the third embodiment, which are the same as those of the portable computer 1 of the first embodiment, are identified by the same reference numerals as those used for the first embodiment and descriptions thereof are omitted.

Figure 8:
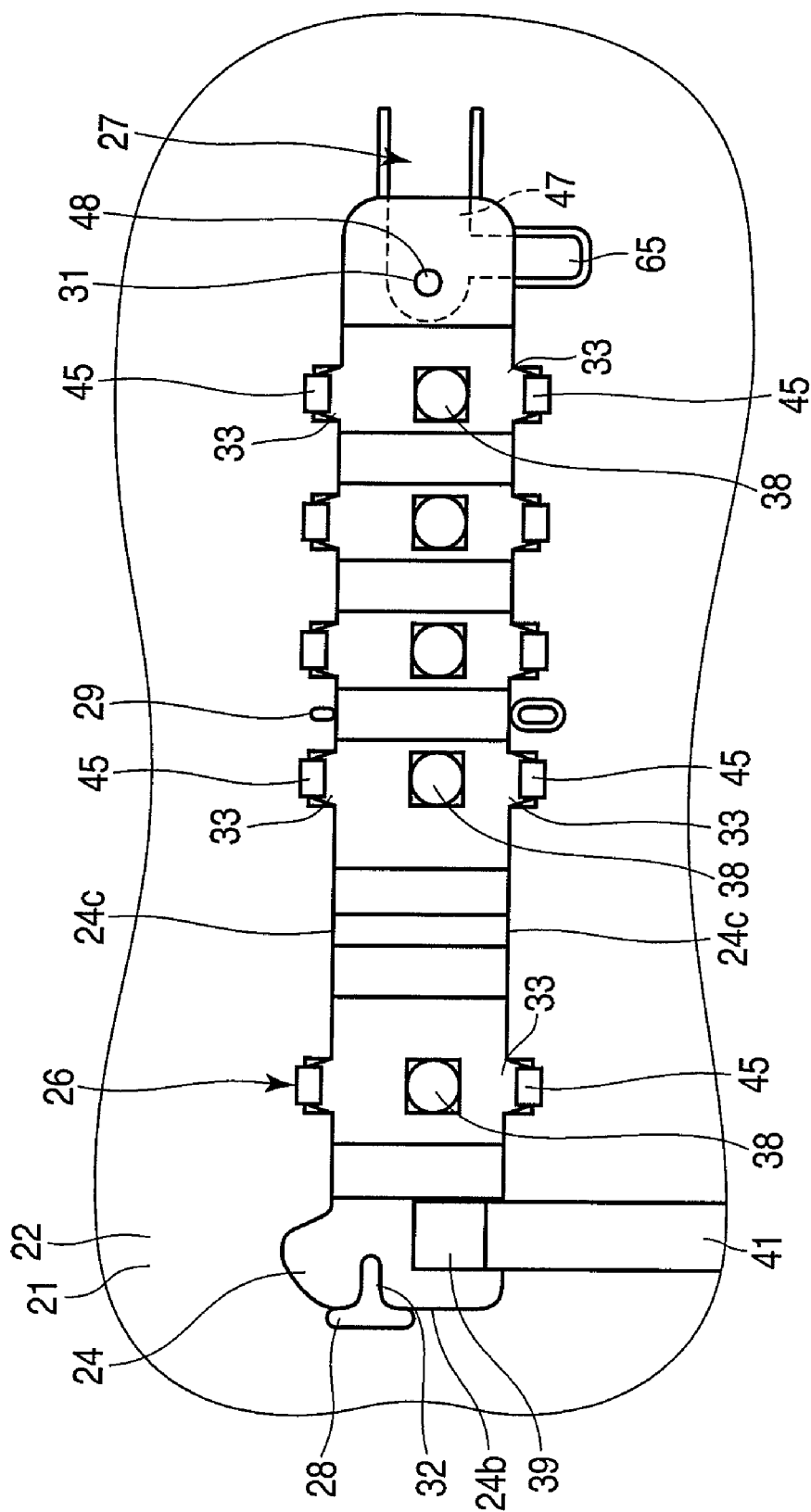
FIG. 8 is an exemplary plan view showing a board attachment structure according to a third embodiment.

FIG. 8 is a plan view showing a structure for attaching a sub board 24 according to the third embodiment. A second fixing portion 27 comprises a lever 65. The lever 65 projects out of the sub board 24 from a flexible portion 47 near a projecting portion 48.

When the lever 65 is pushed down, the flexible portion 47 connected to the lever 65 is bent to lower the projecting portion 48. The lowered projecting portion 48 is removed from a fitting portion 31. Thus, the second fixing portion 27 is displaced to a second position P2 where it is removed from the sub board 24.

In the portable computer 1 having the configuration described above, the second fixing portion 27 is displaced to the second position P2 by pushing down the lever 65. Thus, the sub board 24 can be easily detached from the support surface 22. Further, when the sub board 24 is attached to the support surface 22, pushdown of the lever 65 can prevent the sub board 24 from receiving load.

Next, a fourth embodiment will be described with reference to FIG. 9. In the description, the components of the fourth embodiment, which are the same as those of the portable computer 1 of the first embodiment, are identified by the same reference numerals as those used for the first embodiment and descriptions thereof are omitted.

Figure 9:
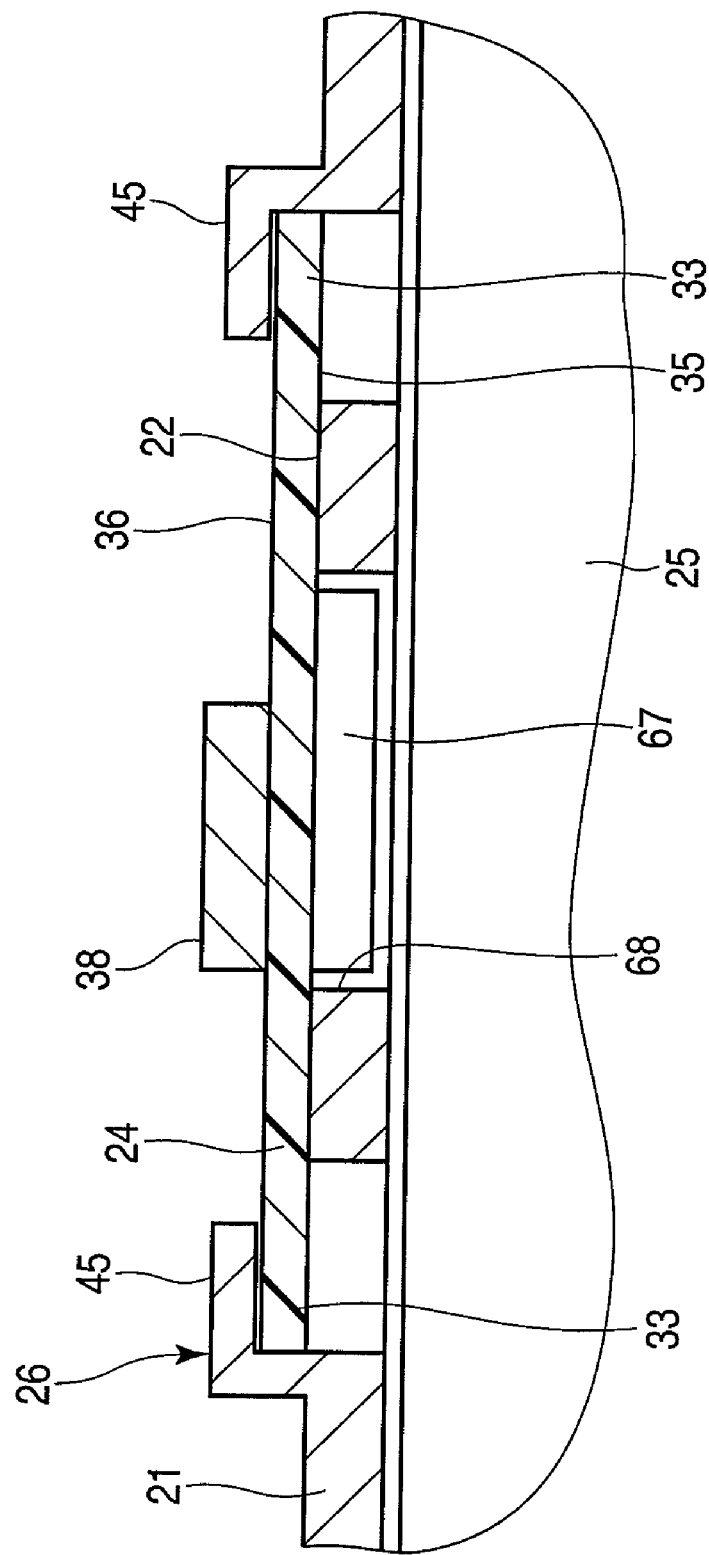
FIG. 9 is an exemplary sectional view showing a board attachment structure according to a fourth embodiment.

FIG. 9 is a sectional view showing a structure for attaching a sub board 24 according to the fourth embodiment. An electronic part 67 is mounted on a first surface 35 of the sub board 24. A support surface 22 is provided with a clearance portion 68, which avoids the electronic part 67 from being put on the support surface 22.

As shown in FIG. 9, the clearance portion 68 is a hole having a size which allows the electronic part 67 to be inserted therein. The clearance portion 68 is shaped as a rectangle which is elongate in the third direction indicated by the arrows X in FIG. 3. The clearance portion 68 can avoid the electronic part 67 from being put on the support surface 22, even before the sub board 24 is attached to the support surface 22.

In the portable computer 1 having the configuration described above, even in the state where the electronic part 67 is mounted on the first surface 35 which faces the support surface 22, the electronic part 67 is avoided from being put on the support surface 22 and inserted in the clearance portion 68. Therefore, various electronic parts can be mounted on both the first surface 35 and the second surface 36 of the sub board 24.

The present invention is not limited to the embodiments described above, but may be variously modified without departing from the spirit or scope of the invention.

For example, the board fixed by the first fixing portion and the second fixing portion is not limited to the sub board, but may be a main board on which the CPU is mounted. Further, the shape of the fitting portion or the cross-sectional shape of the projecting portion is not limited to a circle, but may be any other shape, such as an oval or polygon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a casing;
    a board in the casing and comprising a cut;
    a support surface that is part of the casing and configured to support the board;
    a first fixing portion provided integrally with the support surface and comprising a plurality of hooks configured to hold the board between the hooks and the support surface;
    a second fixing portion provided integrally with the support surface and configured to elastically move between a first position where the second fixing portion engages with the board and a second position where the second fixing portion is removed from the board,
    a holding portion in contact with an edge of the board and inserted in the cut of the board; and
    a switch mounted on the board in a position between one of the hooks and another of the hooks which faces the one of the hooks.

2. The electronic apparatus of claim 1, wherein
    the board comprises a hole; and
    the second fixing portion comprises a flexible portion comprising one end continuous to the support surface, and a projecting portion projecting from another end of the flexible portion toward the board and configured to fit in the hole, the second fixing portion being configured to elastically move between the first position where the projecting portion fits in the hole to engage with the board and the second position where the projecting portion is removed from the board.

3. The electronic apparatus of claim 1, wherein the support surface is provided in the casing.

4. The electronic apparatus of claim 1, further comprising another part disposed on an opposite side of the support surface.

5. The electronic apparatus of claim 1, wherein the second fixing portion is integrally coupled with the support surface at an end of a side separate from the board.

6. An electronic apparatus comprising:
    a casing;
    a board in the casing and comprising a cut and a ground pattern;
    a support surface that is part of the casing, facing the ground pattern and configured to support the board;
    a first fixing portion provided integrally with the support surface and configured to hold the board between the first fixing portion and the support surface;
    a second fixing portion provided integrally with the support surface and configured to elastically move between a first position where the second fixing portion engages with the board and a second position where the second fixing portion is removed from the board;
    a holding portion in contact with an edge of the board and inserted in the cut of the board; and
    a leaf spring portion provided integrally with the support surface and configured to hold the board between the first fixing portion and the leaf spring portion by being elastically brought into contact with the ground pattern of the board.

7. The electronic apparatus of claim 6, wherein
    the board comprises a hole; and
    the second fixing portion comprises a flexible portion comprising one end continuous to the support surface, and a projecting portion projecting from another end of the flexible portion toward the board and configured to fit in the hole, the second fixing portion being configured to elastically move between the first position where the projecting portion fits in the hole to engage with the board and the second position where the projecting portion is removed from the board.

8. The electronic apparatus of claim 6, wherein the support surface is provided in the casing.

9. The electronic apparatus of claim 6, further comprising another part disposed on an opposite side of the support surface.

10. The electronic apparatus of claim 6, wherein the second fixing portion is integrally coupled with the support surface at an end of a side separate from the board.

* * * * *